Feb. 7, 1928.                                                    1,658,055
J. LILLYQUIST
SPEEDOMETER TESTING DEVICE
Filed July 30, 1926             2 Sheets-Sheet 1

Inventor.
John Lillyquist
by Burton & Burton
his Attorneys.

Witness J. C. McKnight.

Feb. 7, 1928.

J. LILLYQUIST 1,658,055

SPEEDOMETER TESTING DEVICE

Filed July 30, 1926   2 Sheets-Sheet 2

Inventor.
John Lillyquist.
by Burton & Burton
his Attorneys.

Patented Feb. 7, 1928.

1,658,055

UNITED STATES PATENT OFFICE.

JOHN LILLYQUIST, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEEDOMETER-TESTING DEVICE.

Application filed July 30, 1926. Serial No. 125,900.

The purpose of this invention is to provide a convenient implement for testing speedometers, particularly when mounted on the vehicle served thereby. It consists in the elements and features of construction shown and described as indicated in the claims.

In the drawings:—

Figure 1:
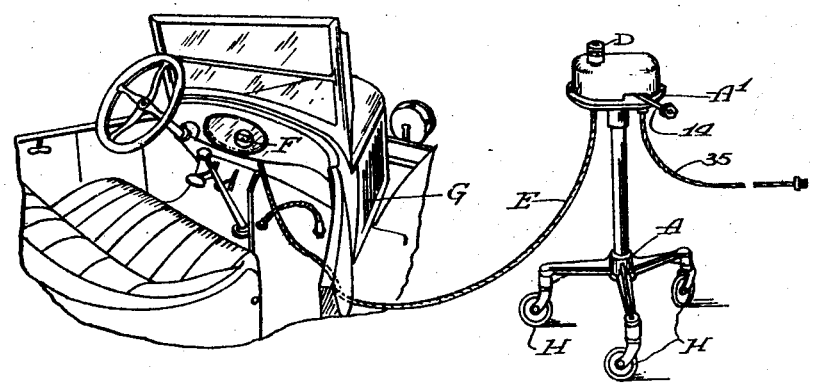
Figure 1 is a perspective view of a device embodying this invention, shown mounted on a wheel carriage for convenience of locating it alongside the vehicle whose speedometer is to be tested.
Figure 2:
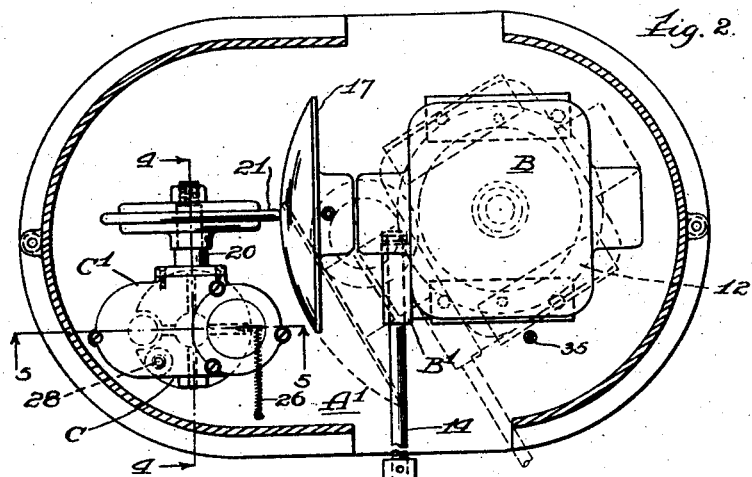
Figure 2 is a plan view of the same. disregarding the wheel standard and with the casing removed.
Figure 3:
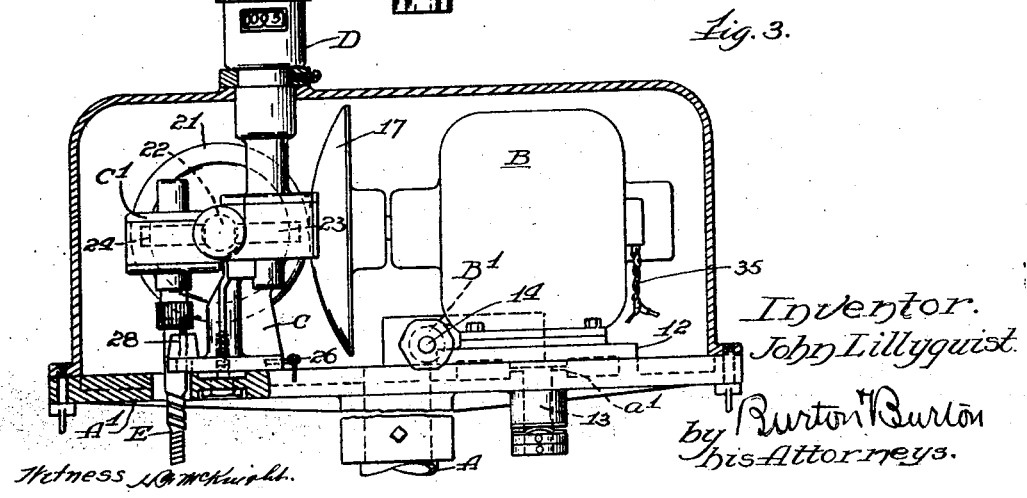
Figure 3 is a side elevation of the structure shown in Figure 2.
Figure 4:
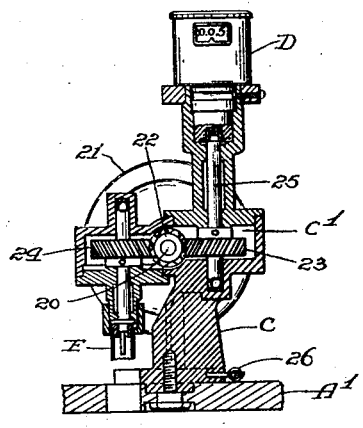
Figure 4 is a section at the line 4—4 on Figure 3.
Figure 5:
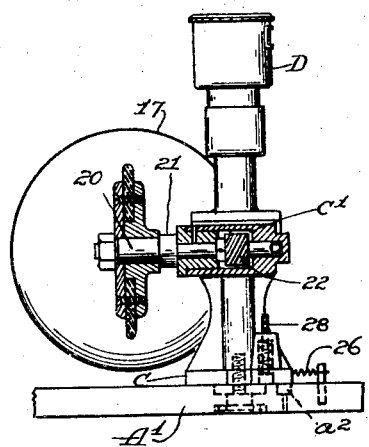
Figure 5 is a section at the line 5—5 on Figure 3.

The structure shown in the drawings comprises a wheeled carriage, A, which is merely a tripod standard carrying at the top a horizontal plate, $A^1$, for turning about an axis which intersects the motor shaft axis; a standard, C, which is mounted on the plate, $A^1$, and comprises the gear housing, $C^1$, for gear train by which the test speedometer mounted on the standard is driven, and the test speedometer D mounted on the upper end of the standard, C. E is a flexible shaft having its casing connected with a standard, C, and its rotating element connected to the shaft of the gearing housed in the standard as above mentioned, said flexible shaft being designed for extending to a speedometer to be tested, usually on the automobile which it serves, as indicated at F on the vehicle indicated conventionally at G in Figure 1. It may be understood that the wheeled standard or carriage may be readily propelled by hand from the carriage to a position adjacent to the vehicle whose speedometer is to be tested and within such distance therefrom that the flexible shaft, E, will reach to the speedometer on the vehicle and may be connected thereto upon disconnecting the flexible shaft by which the speedometer is driven in service on the vehicle.

More in detail the structure may be described as follows:

The motor, B, mounted on the plate, $A^1$, has at its under side a circular boss, 12, from whose center a stem, 13, projects downwardly for pivotal mounting of the motor upon said plate, upon which there is provided a pivot bearing for said stem in a boss, $a^1$, projecting upwardly from the plate. From the boss, $b$, a handle, 14 is extended radially projecting beyond the margin of the plate, $A^1$, a sufficient distance to constitute an operating handle by which the motor may be turned on the support about the stem, 13. Upon the protruding end of the motor shaft and mounted fast for rotation therewith there is a spherical segment head, 17, whose outer spherical surface is adapted for frictional co-operation with a friction pulley, 21, carried on the end of the shaft, 20, which is journaled in the standard, C, and projects therefrom. Within the housing, $C^1$, on the standard this shaft carries a worm gear, 22. Within the housing cavity there are two equal worm gears, 23 and 24, each meshing with the worm gear, 22. The worm gear, 23, is fast on the drive shaft, 25, of the test speedometer, D, which is mounted at the top of the standard as stated. At the side of the housing on the standard opposite the spherical segment head of the shaft it is provided with means for connecting the casing of the flexible shaft, E; and the rotary shaft element of said flexible shaft is operatively connected for rotation with the worm gear, 24. The standard, C, is pivotally mounted on the plate $A^1$, for adjustment about a vertical axis, preferably intersecting the axis of the shaft, 20, so that that shaft extends for carrying the pulley at a substantial distance from said vertical axis, for the purpose that the rotation or swinging of the standard about its pivot may carry the pulley toward and from the spherical segment head, 17, of the motor shaft. A spring, 26, connected at its opposite ends to the plate, $A^1$, and to the base of the standard, C, reacts for holding the pulley normally stressed against the spherical segment head for deriving rotary motion therefrom. A locking pin, 28, is mounted in the base of the standard, C, for engaging an aperture $a^2$ in the plate positioned for registration with the pin when the standard is turned about its pivot for carrying the pulley away from the spherical segment head.

The tripod carriage has each of its feet provided with wheels, H, and the stem or standard of the carriage is of suitable length for positioning the flexible shaft, E, approximately at the customary level of the speedometer on the vehicle as indicated at F, so that minimum length of flexible shaft serves for connecting the testing apparatus to the instrument to be tested.

It will be understood that the speedometer, D, of the testing device is itself a thoroughly tested instrument, that is to say, one whose reading is a correct indication of the speed at which this driving shaft is rotated, and it will be seen that the two gears, 23 and 24, being equal and deriving their rotary movement from the same driving worm gear, 22, the speedometer shaft and the flexible shaft will have the same speed, and the flexible shaft will therefore transmit to the shaft of a speedometer to be tested the speed of the test speedometer.

The flexible shaft being connected to the instrument to be tested, and the motor being energized by closing the switch (not shown) for connecting it with the source of electric current through the electric cable shown at 35, the motor will be started, standing in a position with its axis substantially aligned with the pulley, 21. The operator will next swing the motor about its axis by means of the handle, 14, through an angle for shifting the contact of the spherical segment with the pulley from the center to the circumference of the segment, whereby the pulley will derive increasing speed from zero which it will have at the starting point, to the maximum for which the segment is dimensioned. The speed derived by the shaft of the test speedometer, D, being read upon the speedometer dial, will be compared with the con-current reading of the speedometer which is being tested on the vehicle, and any variation between the two readings at any speeds will be noted for guidance in correcting the instrument which is being tested.

Figure 6:
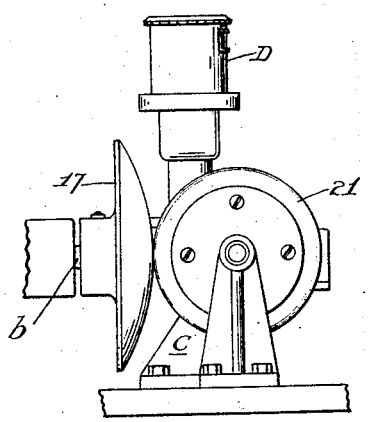
Figure 6 is a side elevation showing the standard which carries the speedometer and the head of the motor shaft in a slightly modified form.
Figure 7:
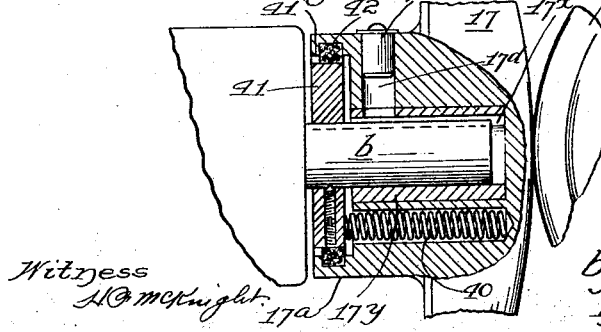
Figure 7 is a sectional detail of the section, being axial with respect to the motor shaft at its engagement with the spherical segment head which is carried for driving the test speedometer.

In Figures 6 and 7 there is shown a slight modification in respect to the manner of holding the friction pulley, 21, pressed against the spherical segment head, 17. In this form the standard, C, is mounted fixedly, and the spherical head, 17, is carried on the motor shaft, $b$, by spline engagement, $17^x$, of a bushing sleeve, $17^y$, which is drive fitted in the hub, $17^a$, of said head, 17, which has a limited range of sliding movements under the stress of the coiled springs, 40, of which three may be employed, distributed around the shaft, only one being seen in the drawings, each lodged in a suitable bore in the hub, $17^a$, and re-acting at the outer end against a disc, 41, made fast on the shaft, $b$, and at its periphery overhung by a flange, $41^c$, which terminates the hub, $17^a$, of the head, 17, a felt ring, 42, being seated in the inner face of the flange and on the periphery of the disc for stopping escape of a lubricant which may be supplied to the oil bearing of the oil pocket, $17^d$, stopped by the plug, $17^e$.

I claim:—

1. In combination with a motor having a driving shaft extending for communicating rotary movement; a spherical segment driving head carried by the shaft; a support on which the motor is pivotally mounted for adjustment bodily about the geometric center of said spherical segment head; a standard carried by the support, a shaft journalled in the standard and a friction pulley on said shaft, the standard being pivotally mounted on the support for turning about an axis transverse to the pulley to carry the pulley toward the spherical segment head on the shaft; means for yieldingly holding said standard with the pulley in contact with said spherical segment head; a plurality of rotary-movement-communicating elements carried by the standard operatively connected with the pulley shaft for deriving equal rotary motion through said pulley; a revolution indicator mounted on the standard, one of the plurality of rotary-movement-transmitting elements being fast on the indicator shaft, and a flexible shaft having its rotary shaft, and a flexible shaft having its rotary element engaged for rotation with another of said rotary-movement-transmitting elements and having its casing secured to the standard.

2. In combination with a motor having a driving shaft extending for communicating rotary movement; a spherical segment driving head carried by the shaft; a support on which the motor is pivotally mounted for adjustment bodily about the geometric center of said spherical segment head; a standard carried by the support; a shaft journalled in said standard, and a friction pulley on the shaft, the standard being operatively mounted on the support for turning about an axis transverse to the pulley shaft to carry the pulley toward the spherical segment head on the shaft; means for yieldingly holding said standard with the pulley in contact with said spherical segment head; a plurality of rotary-movement-communicating elements carried by the standard operatively connected with the pulley shaft for deriving equal rotary movement through said pulley; a revolution indicator mounted on the standard having its driving shaft operatively connected with one of said rotary-movement-transmitting elements; a flexible shaft connected with another of said elements for extending to another speedometer to be tested in comparison with the first; and a wheeled carriage of substantial height upon which the structure comprising the elements above named previous to the mention of the revolution indicator is mounted, said carriage being adapted to be manually propelled, whereby the entire device may be propelled into convenient proximity to a vehicle for connection of a flexible shaft to the vehicle speedometer for testing the latter.

3. In combination with a structure comprising a support, a motor and a mechanism operated thereby both mounted on the support, means for communicating rotary movement from the motor driving shaft to the mechanism, the motor being mounted for adjustment bodily about a center aligned with the motor shaft axis, said mechanism comprising a plurality of rotary-movement-communicating elements; a revolution indicator mounted on the support having its driving shaft operatively connected with one of said rotary-movement-communicating elements and a flexible shaft connected with the other of said elements; a wheeled carriage of substantial height upon which said support carrying the motor and said mechanism is mounted, said carriage being adapted to be manually propelled, whereby the entire device may be propelled into convenient proximity to a vehicle for connection of the flexible shaft to the vehicle speedometer for testing the latter.

In testimony whereof, I have hereunto set my hand at Chicago, Illinois, this 20th day of July, 1926.

JOHN LILLYQUIST.